(12) United States Patent
Andrews et al.

(10) Patent No.: US 7,736,783 B2
(45) Date of Patent: Jun. 15, 2010

(54) VERY THIN, LIGHT BIPOLAR PLATES

(75) Inventors: Craig Andrews, College Station, TX (US); Chris Boyer, Houston, TX (US); Oliver J. Murphy, Bryan, TX (US); Al Cisar, Cypress, TX (US); Brad Fiebig, Bryan, TX (US)

(73) Assignee: Lynntech, Inc., College Station, TX (US)

( * ) Notice: Subject to any disclaimer, the term of this patent is extended or adjusted under 35 U.S.C. 154(b) by 1911 days.

(21) Appl. No.: 10/727,854

(22) Filed: Dec. 4, 2003

(65) Prior Publication Data

US 2004/0161653 A1 Aug. 19, 2004

Related U.S. Application Data

(60) Provisional application No. 60/431,007, filed on Dec. 4, 2002.

(51) Int. Cl.
 *H01M 8/02* (2006.01)
(52) U.S. Cl. .......................................... 429/34; 429/38
(58) Field of Classification Search ................ 429/12, 429/30, 34, 35, 36, 38, 39
See application file for complete search history.

(56) References Cited

U.S. PATENT DOCUMENTS

| 3,126,302 A | 3/1964 | Drushella |
| 3,617,385 A | 11/1971 | Gray |
| 3,650,005 A | 3/1972 | Kamlya et al. |
| 3,717,505 A | 2/1973 | Unkle, Jr. et al. |
| 3,846,903 A | 11/1974 | Rupert et al. |
| 3,937,858 A | 2/1976 | Thiele |
| 4,015,950 A | 4/1977 | Galland et al. |

(Continued)

FOREIGN PATENT DOCUMENTS

EP    05029001    5/1993

(Continued)

OTHER PUBLICATIONS

JP5109415; Apr. 30, 1993; Abstract (Japan); 1 page.

(Continued)

*Primary Examiner*—Patrick Ryan
*Assistant Examiner*—Monique Wills
(74) *Attorney, Agent, or Firm*—Jeffrey L. Streets; Streets & Steele (57) ABSTRACT

A bipolar plate comprising a fluid barrier and a sealing frame formed around and overlaping the perimeter of the fluid barrier. The fluid barrier is placed in a mold and then a polymer is injected into the mold, thereby forming the sealing frame around the fluid barrier such that the sealing frame overlaps the perimeter of the fluid barrier. Because there are no surfaces to seal between the perimeter of the fluid barrier and the sealing frame, gaskets or other sealing surfaces are not required. A bipolar plate is further provided comprising a fluid barrier having the perimeter of the fluid barrier between a preformed cathode sealing frame and an anode sealing frame. The anode and cathode sealing frames are adapted to receive an overlapped portion of the perimeter of the fluid barrier. The anode and cathode sealing frames are then bonded together to form a fluid tight seal.

43 Claims, 4 Drawing Sheets

U.S. PATENT DOCUMENTS

| | | |
|---|---|---|
| 4,115,604 A | 9/1978 | Bernstein |
| 4,135,656 A | 1/1979 | Stern |
| 4,175,165 A | 11/1979 | Adhart |
| 4,297,421 A | 10/1981 | Turillon et al. |
| 4,516,632 A | 5/1985 | Swift et al. |
| 4,533,455 A | 8/1985 | Balko et al. |
| 4,615,107 A | 10/1986 | Kumeta et al. |
| 4,619,753 A | 10/1986 | Christen et al. |
| 4,780,342 A | 10/1988 | LeBlanc, Jr. |
| 4,882,202 A | 11/1989 | Holtzman et al. |
| 4,900,643 A | 2/1990 | Eakra et al. |
| 4,943,480 A | 7/1990 | Itzhak |
| 4,973,358 A | 11/1990 | Jin et al. |
| 5,058,665 A | 10/1991 | Harada |
| 5,070,607 A | 12/1991 | Boardman et al. |
| 5,112,703 A | 5/1992 | Koenig |
| 5,200,281 A | 4/1993 | Leap et al. |
| 5,217,751 A | 6/1993 | King et al. |
| 5,251,374 A | 10/1993 | Halstead et al. |
| 5,252,410 A | 10/1993 | Wilkinson et al. |
| 5,264,305 A | 11/1993 | Charkey |
| 5,348,817 A | 9/1994 | Rao et al. |
| 5,482,792 A | 1/1996 | Faita et al. |
| 5,496,655 A | 3/1996 | Lessing |
| 5,578,388 A | 11/1996 | Faita et al. |
| 5,589,662 A | 12/1996 | Schleicher et al. |
| 5,641,586 A | 6/1997 | Wilson |
| 5,776,624 A | 7/1998 | Neutzler |
| 5,798,187 A | 8/1998 | Wilson et al. |
| 5,800,946 A | 9/1998 | Grosvenor et al. |
| 5,858,569 A | 1/1999 | Meacher et al. |
| 5,916,505 A | 6/1999 | Cisar et al. |
| 5,981,098 A | 11/1999 | Vitale |
| 5,993,494 A * | 11/1999 | Malikayil ................ 29/623.5 |
| 6,020,083 A | 2/2000 | Breault et al. |
| 6,022,634 A | 2/2000 | Ramunni et al. |
| 6,054,228 A | 4/2000 | Cisar et al. |
| 6,071,636 A | 6/2000 | Mosdale |
| 6,099,716 A | 8/2000 | Molter et al. |
| 6,146,780 A | 11/2000 | Cisar et al. |
| 6,171,721 B1 | 1/2001 | Narayanan et al. |
| 6,190,793 B1 | 2/2001 | Barton et al. |
| 6,220,497 B1 | 4/2001 | Benz et al. |
| 6,231,053 B1 * | 5/2001 | Wakamatsu ................ 277/628 |
| 6,638,657 B1 * | 10/2003 | Cisar et al. .................... 429/35 |
| 6,986,961 B1 * | 1/2006 | Ren et al. ..................... 429/38 |
| 2003/0003343 A1 * | 1/2003 | Cisar et al. .................... 429/36 |

FOREIGN PATENT DOCUMENTS

| | | |
|---|---|---|
| EP | 0 629 015 A1 | 4/1994 |
| EP | 0 784 352 A1 | 7/1996 |
| EP | 0 817 297 A2 | 6/1997 |
| EP | 1009051 A2 | 6/2000 |
| EP | 1089369 A2 | 4/2001 |
| GB | 2326017 A | 9/1998 |
| WO | WO/88/06941 | 3/1988 |
| WO | WO98/37457 | 2/1997 |
| WO | WO 98/33221 | 7/1998 |
| WO | WO 01/15257 A2 | 3/2001 |

OTHER PUBLICATIONS

JP 60074359; Apr. 26, 1985; Abstract (Japan); 1 page.

* cited by examiner

VERY THIN, LIGHT BIPOLAR PLATES

This application claims priority to U.S. Provisional Patent Application No. 60/431,007 filed on Dec. 4, 2002.

BACKGROUND OF THE INVENTION

1. Field of the Invention

The present invention relates to electrochemical cell components, and more specifically to separator plates within electrochemical cell stacks.

2. Description of Related Art

Electrochemical cells having proton exchange membranes (PEM) may be configured into electrochemical cell stacks. Each of the electrochemical cells in the stack are separated from adjacent cells with bipolar separator plates. These bipolar separator plates are typically made from a variety of metals, such as titanium and stainless steel, and from non-metallic conductors, such as graphitic carbon. Bipolar separator plates may be fabricated by machining fluid flow fields into solid sheets of material. The flow fields typically comprise a series of channels or grooves that direct the flow of gases and liquids over the faces of the electrodes.

In a typical electrochemical cell, the membrane and electrode assembly (MEA) may be supported on either side by the fluid flow fields and the bipolar plate, and are surrounded by cell frames that provide sealing surfaces and support. The cell frames have at least one manifold or flow passage, and often have several manifolds to direct the reactant and product fluid streams to their respective cathode or anode sides of the electrochemical cells. In a single cell arrangement, cell frames, flow fields and bipolar plates are provided on each of the anode and cathode sides.

The cell frames are usually sealed by means of sealing ridges, which are embossed, machined, or molded into the frame. The sealing features react against gaskets included in the stack to maintain fluid tight joints and also to grip the gaskets, which prevents creep and extrusion of the membrane. The electrochemical cell stack is conventionally placed under compressive forces by the bars that are threaded though the stack and apply compressive forces through the end plates at each end of the stack. The compression of the fuel cell stack applies the sealing force to the sealing surfaces between the separator plates and membranes. Such seals typically circumscribe the manifolds and the electrochemically active area on the cell frame.

In addition to providing a fluid flow field and structural support for the MEA, a bipolar separator plate also collects electrons liberated at one electrode, conducts the electrons through the plate, and delivers electrons to the face of another electrode on the opposing side of the plate. In this manner, the bipolar plate acts as a current collector and therefore is usually constructed of a conductive material.

Conventional PEM electrochemical cells may have bipolar plates that are constructed from a variety of materials of construction depending on the service of the electrochemical cell stack and the corrosiveness of the reactants and products flowing through the stack. Often the bipolar plate may be fabricated from a solid sheet of material having the flow fields machined or stamped into the surface of the solid sheet. Alternatively, the bipolar plates may be formed in molds having flow fields included in the mold design.

Watkins, et al., in U.S. Pat. No. 5,108,849, issued Apr. 28, 1992, discloses a fluid flow field plate made of a conducting material, preferably graphite. A fluid flow channel is machined, stamped or molded into the surface of the fluid flow field-plate. The disclosed fluid flow plate has a fairly high density and lends considerably to the overall weight of an electrochemical cell stack.

Mercuri, et al., in U.S. Pat. No. 6,037,074, issued Mar. 14, 2000, discloses a fluid flow field plate constructed of a graphite sheet impregnated with a resin and dispersed throughout with needle shaped ceramic fibers. A flow channel is stamped into one surface of the graphite sheet and the opposite surface is backed with a second graphite sheet to impart rigidity to the assembly.

It is apparent that the bipolar plates and cell frames contribute greatly to the bulk and weight of electrochemical cell stacks. Accordingly, there remains a need for bipolar plates having significantly less density so that the overall weight of the electrochemical cell stack may be reduced. It would be an advantage if the bipolar plate also had reduced dimensions, thereby further decreasing the weight of the electrochemical cell stack.

SUMMARY OF THE INVENTION

The present invention provides a bipolar plate having a fluid barrier and a sealing frame formed around a perimeter of the fluid barrier, wherein the frame is formed by injecting a polymer into a mold overlapping the perimeter of the fluid barrier. The fluid barrier may be a metal and may be selected from, for example, titanium, stainless steel, nickel, tantalum, niobium, and alloys thereof. The fluid barrier may be plated with a metal selected, for example, from gold, silver, copper, platinum, and combinations thereof. Alternately the fluid barrier may be an electrically conductive non-metal, such as a conductive polymer or metal filled polymer.

The bipolar plate may further comprise an anode flow field on a first side of the fluid barrier and a cathode flow field on the second side. The anode and cathode flow fields may be attached to the fluid barrier before the sealing frame is formed around the perimeter. Optionally, they may be attached after the sealing frame is formed. The flow fields may be attached to the fluid barrier by methods selected from, for example, adhesives, sintering, soldering and combinations thereof. Optionally, the flow fields may be etched into the fluid barrier. The flow fields may also be made of materials selected from, for example, expanded metal mesh, metal foam, conducting polymer foam, porous conductive carbon material and combinations thereof.

The bipolar plate may also include a first gasket to provide a sealing surface between a first side of the sealing frame and a first membrane and electrode assembly and a second gasket to provide a sealing surface between a second side of the sealing frame and a second membrane and electrode assembly. The gaskets may optionally be applied by print screening or the gaskets may be incorporated into the sealing frame.

The bipolar plate may further include components selected from alignment pins, alignment holes, reinforcing liners for fluid passages, fluid manifolds and combinations thereof, wherein the sealing frame is formed around the components.

The polymer used to form the frame may be selected from a thermoplastic, a thermoset, a reactive set and combinations thereof. Examples of suitable polymers include polyvinylidene fluoride, polyvinylidene difluoride, polytetrafluoroethylene, polyamides, polysulfone, polyetherketones, polycarbonate, polypropylene, polyimides, polyurethanes, epoxies, silicones, and combinations thereof. The polymer may be mixed with a filler, such as organic polyamide fibers, to improve the characteristics of the polymer and modify the performance of the polymer. The filler may also act as a diluent.

The present invention further provides a bipolar plate comprising a gas barrier having a cathode side and an anode side, a cathode sealing frame adapted to receive a perimeter of the cathode side of the fluid barrier, and an anode sealing frame adapted to receive a perimeter of the anode side of the fluid barrier, wherein the cathode sealing frame and anode sealing frame are bonded together to form a fluid seal. The fluid barrier may be a metal and may be selected from, for example, titanium, stainless steel, nickel, tantalum, niobium, and alloys thereof. The fluid barrier may be plated with a metal selected, for example, from gold, silver, copper, platinum, and combinations thereof. Alternately the fluid barrier may be an electrically conductive non-metal, such as a conductive polymer or metal filled polymer.

The frames and flow fields are similar to those discussed above. However, the frames in this embodiment are not formed around the fluid barrier. Instead, a cathode sealing frame and an anode sealing frame are separately formed as above, and then the cathode sealing frame and the anode sealing frame are bonded on either side of the gas barrier by a method selected from heat welding, chemical welding, adhesives, and combinations thereof. Alternatively, gaskets may be used to create a fluid tight seal between the cathode and anode sealing frames. The gaskets suitable for use may include, for example, o-rings, gaskets incorporated into one of the sealing frames, and gaskets applied by print screening.

The fluid barrier may not extend to the components. Rather the fluid barrier may overlap the anode sealing frame and the cathode sealing frame only a sufficient amount to create a fluid-tight seal.

Another embodiment of the present invention includes a fluid cooled bipolar plate comprising a cathode fluid barrier, an anode fluid barrier, an anode sealing frame adapted to receive a perimeter of an anode side of the anode fluid barrier, a cathode sealing frame adapted to receive a perimeter of a cathode side of the cathode fluid barrier, a cooling frame adapted to receive a perimeter of a cathode side of the anode fluid barrier and a perimeter of the anode side of the cathode fluid barrier, wherein an anode side of the cooling frame is bonded to the anode frame to form a fluid seal and the cathode side of the cooling frame is bonded to the cathode frame to form a fluid seal. The fluid barrier may be a metal and may be selected from, for example, titanium, stainless steel, nickel, tantalum, niobium, and alloys thereof. The fluid barrier may be plated with a metal selected, for example, from gold, silver, copper, platinum, and combinations thereof. Alternately the fluid barrier may be an electrically conductive non-metal, such as a conductive polymer or metal filled polymer. The fluid barriers may be made of different materials.

The bipolar plate may further include the anode side of the anode fluid barrier having an anode flow field, the cathode side of the cathode fluid barrier having a cathode flow field, and a cooling flow field parallel to and between the cathode fluid barrier and the anode fluid barrier. The anode flow field and the cathode flow field may be attached to the fluid barriers before the cathode sealing frame and the anode sealing frame are bonded to the cooling frame or alternatively afterwards. The flow fields may be attached by methods selected from, for example, adhesives, sintering, soldering and combinations thereof.

The sealing frames and flow fields are formed as previously discussed. The sealing frames may be bonded by methods selected from, for example, heat welding, chemical welding, adhesives, and combinations thereof. Gasketing surfaces may be used to create fluid tight seals between components that are not otherwise bonded. As above, the anode fluid barrier overlaps the anode sealing frame and the cathode fluid barrier overlaps the cathode sealing frame only a sufficient amount to create a fluid-tight seal.

A method for assembling the bipolar plate of the present invention is also included. The steps provide inserting a perimeter of the gas barrier into a mold and injecting a polymer into the mold. The method further includes bonding an anode flow field onto an anode side of the fluid barrier and bonding a cathode flow field onto a cathode side of the fluid barrier.

A method for assembling the fluid cooled bipolar plate is also provided. The method provides adapting the cathode sealing frame and the anode sealing frame to receive a perimeter of the gas barrier, aligning the cathode sealing frame and the anode sealing frame around the perimeter of the gas barrier, bonding the cathode sealing frame to the anode sealing frame, wherein the bond creates a fluid tight seal.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

The present invention provides a bipolar plate for use in an electrochemical cell stack comprising a fluid barrier and a sealing frame that is formed around and overlaps the perimeter of the fluid barrier. The sealing frame is formed around the fluid barrier by, for example, placing the fluid barrier in a mold and then injecting a polymer into the mold, thereby forming the sealing frame around the fluid barrier such that the sealing frame overlaps the perimeter of the fluid barrier. Because there are no surfaces to seal between the perimeter of the fluid barrier and the sealing frame, gaskets or other sealing surfaces are not required, thereby providing a slimmer and lighter bipolar plate having fewer parts to assemble.

The present invention further provides a bipolar plate comprising a fluid barrier having the perimeter of the fluid barrier between a preformed cathode sealing frame and an anode sealing frame. In this embodiment, the anode and cathode sealing frames are adapted to receive an overlapped portion of the perimeter of the fluid barrier. The anode and cathode sealing frames are then bonded together to form a fluid tight seal.

In yet another embodiment, the present invention provides a cooled bipolar plate comprising a cathode fluid barrier, an anode fluid barrier, and three sealing frames: the anode sealing frame, the cathode sealing frame, and the cooling sealing frame. In the cooled bipolar plate, a cooling fluid, such as water, is circulated between the two fluid barriers, carrying excess heat away from the electrochemical cell. Alternatively, a heating fluid may be circulated between the two fluid barriers to heat the electrochemical cell rather than to cool it. The anode sealing frame is bonded to the anode side of the cooling frame, overlapping the perimeter of the anode fluid barrier. The cathode sealing frame is bonded to the cathode side of the cooling frame, overlapping the perimeter of the cathode fluid barrier.

The sealing frames may be made from a polymer selected from, for example, thermoplastics, thermosets, reactive sets and combinations thereof. The polymer may be selected from polyvinylidene fluoride, polyvinylidene difluoride, polytetrafluoroethylene, polyamides, polysulfone, polyetherketones, polycarbonate, polypropylene, polyimides, polyurethanes, epoxies, silicones, and combinations thereof. These polymers are all non-conductive so that the sealing frames are non-conductive when made from these polymers.

Optionally, the polymers used to form the sealing frames may be mixed with one or more fillers. The fillers may be added to modify the performance of the polymer, act as a diluent, or combinations thereof. The filler may be, for example, organic polyamide fibers, which improves the strength of the frames.

The sealing frame may be formed by a method selected from, for example, injection molding, compression molding and other methods known to those having ordinary skill in the art. The sealing frames may also include other features, such as alignment pins, alignment holes, reinforcing liners for fluid passages, fluid manifolds and combinations thereof. These features may be included in the mold design, thereby allowing the features to be formed in the sealing frames during the molding process. Alternatively, a sealing frame may be machined from a block of the polymer. Furthermore, some of the features, such as alignment holes and manifolds, may be machined or drilled into the sealing frames after the sealing frames have been formed.

The fluid barriers are preferably conductive so that the fluid barriers may transport electrons as part of the electrical circuit formed through the electrochemical cells. The fluid barrier may be a conductive graphitic material. The fluid barrier is preferably a metal. The fluid barriers may be made from a metal selected from titanium, stainless steel, nickel, tantalum, niobium, and alloys thereof. Optionally, the fluid barriers may be plated with a second metal. The plating metal may be selected from gold, platinum, silver, copper, and combinations thereof.

Preferably the fluid barriers do not extend to the outer perimeter of the sealing frame. The channels, manifolds, alignment holes, alignment pins and other similar features of the sealing frames may all be located beyond the overlapped perimeter of the fluid barrier. Preferably, the sealing frame overlaps the fluid barrier perimeter just sufficiently to allow the formation of a fluid tight seal. There are two advantages associated with minimizing the overlap between the fluid barrier and the sealing frames. First, because there is less material used to form the smaller fluid barrier, the weight of the fluid barrier and hence, the weight of the bipolar plate is reduced. Secondly, the fluid barrier does not have to be drilled or machined to form the additional features found in the sealing frames such as, for example, the fluid channels, manifolds, and alignment pins.

Optionally a retaining band may be provided around the outer perimeter of the sealing frames. The optional retaining band provides hoop stress reinforcement to insure pressure containment if pressure containment is a requirement for a particular application.

Figures 1, 2:
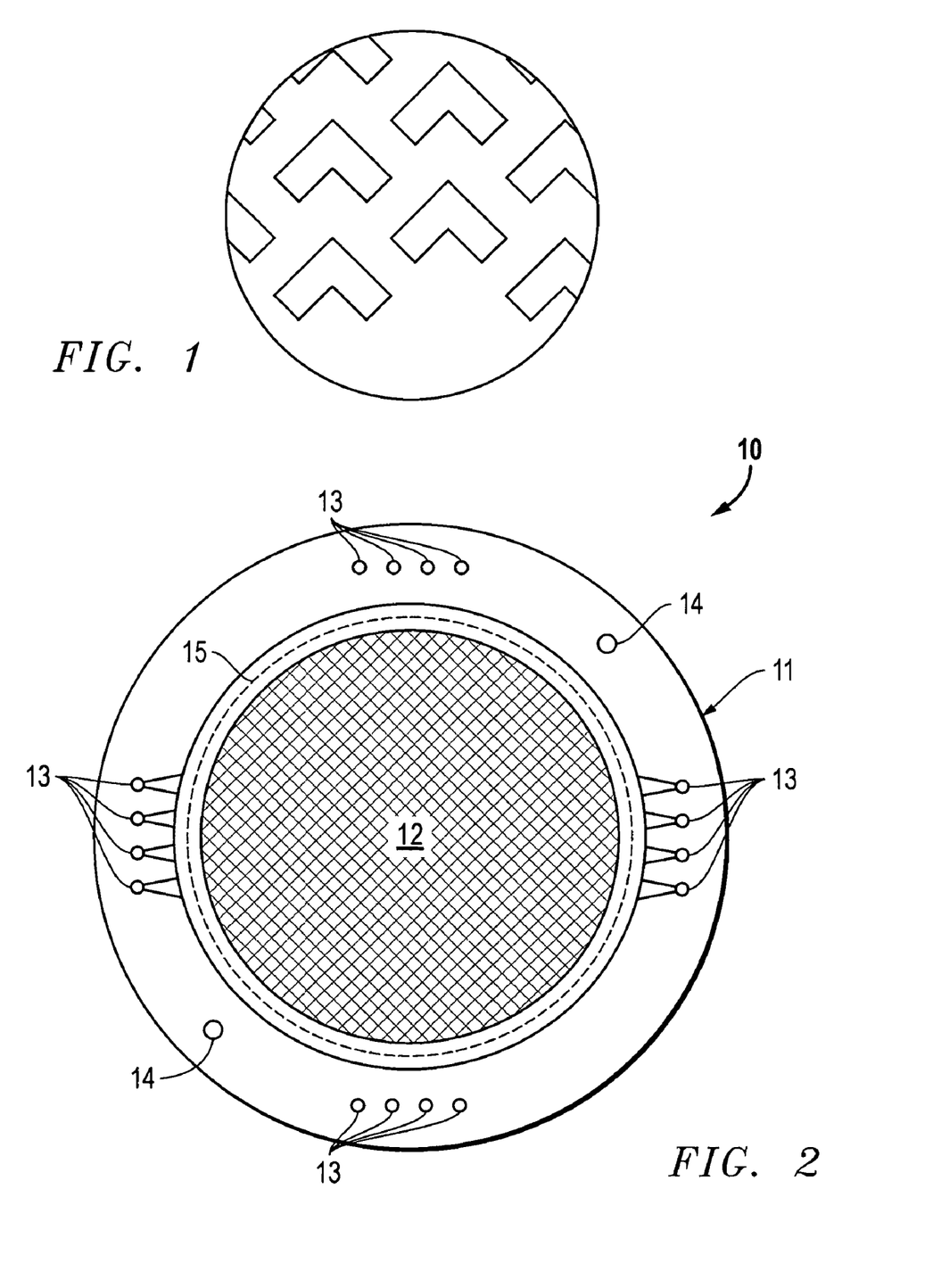
FIG. 1 illustrates one pattern that may be chemically etched into a fluid barrier to create a flow field.
FIG. 2 is a top view of a bipolar plate having the sealing frame formed around the fluid barrier in accordance with the present invention.

The bipolar plate of the present invention may also provide an anode flow field and a cathode flow field. The flow fields may be bonded to the bipolar plate before the sealing frame surrounds the fluid barrier. The flow fields may be bonded to the bipolar plate by methods known to those having ordinary skill in the art. Such methods may include, for example, adhesives, soldering, sintering and combinations thereof. Information on bonding flow fields to fluid barriers and assembling bipolar plates and electrochemical cell stacks is fully disclosed by Cisar, et al., in U.S. Pat. No. 6,146,780, which is hereby fully incorporated herein by reference. Alternatively, the flow fields may be etched into the fluid barrier by chemical etching using a photo-imaged pattern, thereby producing a gas barrier with flow fields from a single piece of metal. FIG. 1 illustrates one pattern that may be chemically etched into a fluid barrier using a photo-imaged pattern to create a flow field. The pattern illustrated in FIG. 1 has been found to offer an excellent combination of maximizing electrical contact, minimizing gas flow resistance, and minimizing part weight.

Flow fields bonded to the fluid barrier may be formed from material selected from expanded metal mesh, metal foam, conducting polymer foam, porous conductive carbon material and combinations thereof.

An anode flow field may be attached to or formed on the anode side of a gas barrier and a cathode flow field may be attached to or formed on the cathode side of a fluid barrier. For a fluid cooled bipolar plate, having an anode fluid barrier and a cathode fluid barrier that form a cooling fluid chamber between them, a cooling flow field may be attached or formed on either the cathode fluid barrier or the anode fluid barrier on the cooling chamber side of the fluid barrier.

The bipolar plate of the present invention, having the sealing frame formed around and overlapping the perimeter of the fluid barrier, is thinner than a conventional bipolar plate. The gaskets required by a conventional bipolar plate, to seal between the fluid barrier and the sealing frames, add thickness to the assembled conventional bipolar plate. Since these gaskets are not required by the bipolar plate having the sealing frame formed around and overlapping the perimeter of the fluid barrier, bipolar plate of the present invention may be much thinner, subject only to the thickness required to provide flow fields deep enough to allow the fluids to pass through the flow fields without unacceptable pressure drops. Furthermore, the width of the sealing frame of the present invention may be reduced because the sealing areas required for the gaskets of the conventional bipolar plate are not required. This further reduces the weight of the bipolar plate.

FIG. 2 is a top view of a bipolar plate having the sealing frame formed around the fluid barrier in accordance with the present invention. The bipolar plate 10 comprises the fluid frame 11 that is formed around the fluid barrier 15. An anode flow field 12 is shown attached to the fluid barrier 15. Fluid manifolds 13 allow reactant fluids and products to flow to and from the electrochemical cells forming the electrochemical cell stack. Alignment holes 14 are also shown that may be used to properly align the bipolar plate during the electrochemical cell stack assembly.

Figure 3:
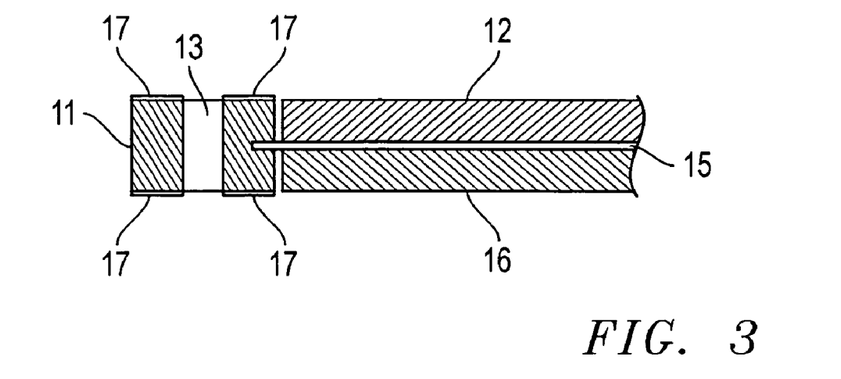
FIG. 3 is a cross-sectional view of the bipolar plate illustrated in FIG. 2.

FIG. 3 is a cross-sectional view of the bipolar plate illustrated in FIG. 2. As may be seen in FIG. 3, the sealing frame 11 is formed around the fluid barrier 15. The fluid barrier 15 does not extend to the manifolds 13 but only extends far enough into the sealing frame to form a fluid seal. The anode flow field 12 is attached to the anode side of the fluid barrier 15 and the cathode flow field 16 is attached to the cathode side of the fluid barrier 15. Gasket surfaces 17 are optionally incorporated into the sealing frame 11 and may be produced by a screen-printing process prior to assembly of the electrochemical cell stack.

Figure 4:
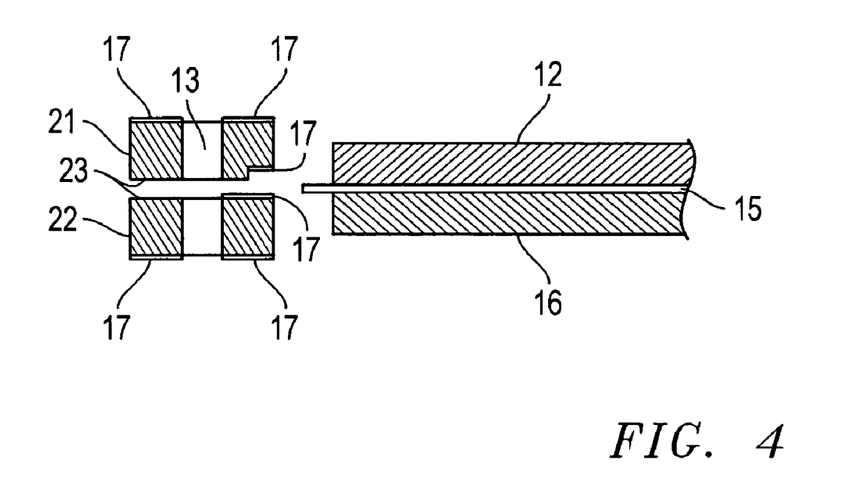
FIG. 4 is an exploded view of a bipolar plate assembled with a cathode sealing frame and an anode sealing frame in accordance with the present invention.

FIG. 4 is an exploded view of a bipolar plate assembled with a cathode sealing frame and an anode sealing frame in accordance with the present invention. A cathode sealing frame 22 and an anode sealing frame 21 may be formed, for example, by injection molding, compression molding or machined from a block of solid polymer. An anode flow field 12 and a cathode flow field 16 are attached to the fluid barrier 15. Gasket surfaces 17 are optionally incorporated into the sealing frames 21, 22 and may be produced by a screen-printing process prior to assembly of the electrochemical cell stack. The manifold 13 is used to transport reactant fluids and products to and from the electrochemical cell. After the anode seal frame 12 and the cathode seal frame 22 are placed around the fluid barrier 15, the mating surfaces 23 may be bonded together by, for example, adhesives, chemical welding, or laser welding.

Figure 5:
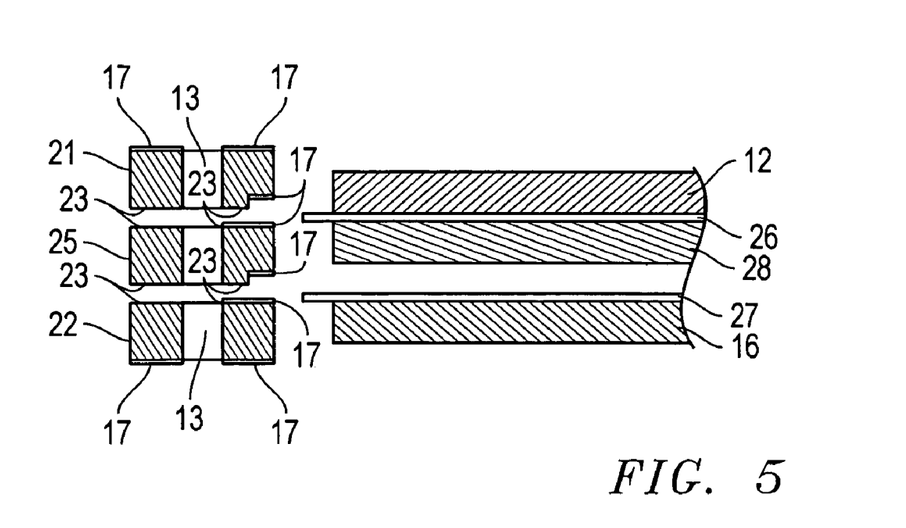
FIG. 5 is an exploded view of a fluid cooled bipolar plate assembled with a cathode sealing frame, an anode sealing frame and a cooling sealing frame in accordance with the present invention.

FIG. 5 is an exploded view of a fluid cooled bipolar plate assembled with a cathode sealing frame, an anode sealing frame and a cooling sealing frame. The anode sealing frame 21, the cathode sealing frame 22 and the cooling sealing frame 25 may be formed, for example, by injection molding, compression molding or machined from a block of solid polymer. An anode flow field 12 is attached to the anode side of the anode fluid barrier 26. A cooling flow field 28 is attached to the cooling side of the anode fluid barrier 26. A cathode fluid barrier 27 is parallel to the anode fluid barrier 26 and a cathode flow field 16 is attached to the cathode side of the cathode fluid barrier 27. Gasket surfaces 17 are optionally incorporated into the sealing frames 21, 25, 22 and may be produced by a screen-printing process prior to assembly of the electrochemical cell stack. The manifold 13 is used to transport reactant fluids and products to and from the electrochemical cell. After the anode seal frame 21 and the cooling seal frame 22 are placed around the anode fluid barrier 26, the mating surfaces 23 may be bonded together by, for example, adhesives, chemical welding, or laser welding. Likewise, after the cathode sealing frame 22 and the cooling sealing frame 25 are placed around the cathode fluid barrier 27, the mating surfaces 23 may be bonded together by, for example, adhesives, chemical welding, or laser welding.

Figure 6A:
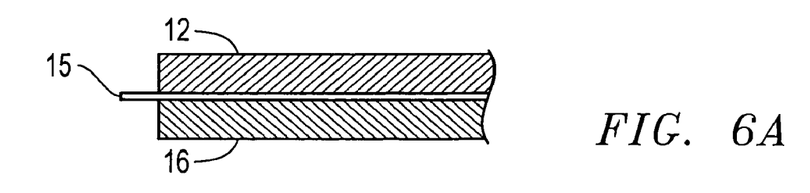
FIG. 6A-E illustrates a method for making a bipolar plate having a sealing frame formed around the fluid barrier in accordance with the present invention.
Figure 6B:
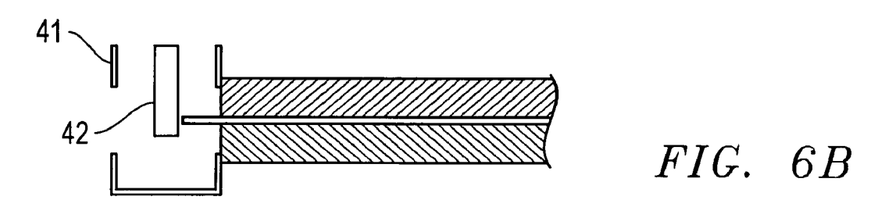
Figure 6C:
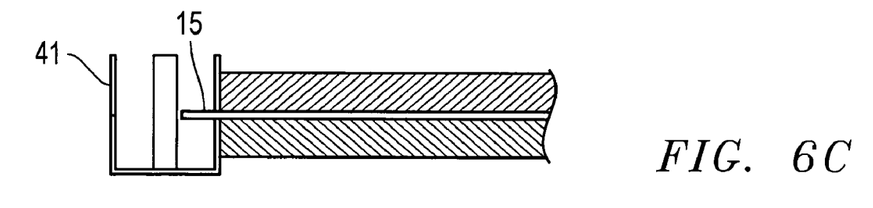
Figure 6D:
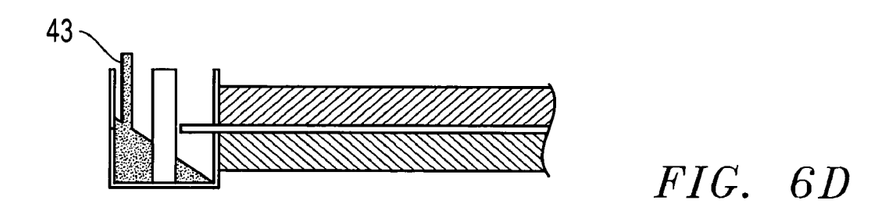
Figure 6E:
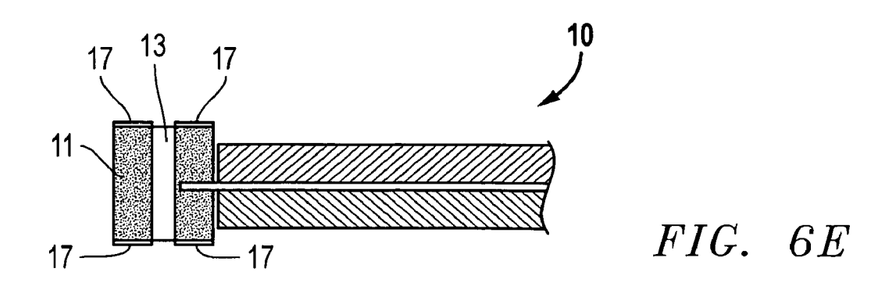

FIGS. 6A-E illustrate a method for making a bipolar plate having a sealing frame formed around the fluid barrier in accordance with the present invention. FIG. 6A illustrates the step of providing a fluid barrier 15 having an anode flow field 12 attached to the anode side of the fluid barrier 15 and having a cathode flow field 16 attached to the cathode side of the fluid barrier 15. FIG. 6B illustrates a second step of inserting the fluid barrier 15 into a mold 41. The mold 41 has a solid piece 42 that forms a manifold in the completed sealing frame. In FIG. 6C, the mold 41 is closed, with a sufficient portion of the fluid barrier 15 being within the mold 41 to provide a seal between the sealing frame and the fluid barrier 15. In FIG. 6D, polymer 43 is injected into the mold. In FIG. 6E, the polymer 43 has solidified and the bipolar plate 10 removed from the mold 41 having formed the sealing frame 11 with the manifold 13. Optionally, gasket surfaces 17 are incorporated into the sealing frame 11, produced by a screen-printing process.

Figure 7A:
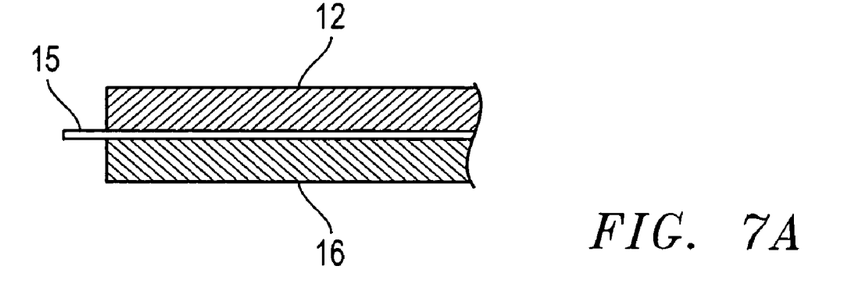
FIG. 7A-D illustrates a method form making a bipolar plate with a cathode sealing frame and an anode sealing frame in accordance with the present invention.
Figure 7B:
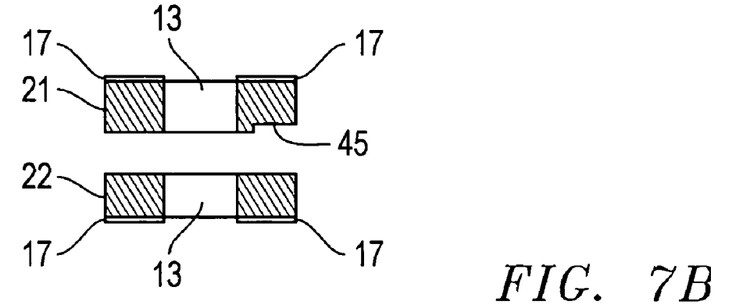
Figure 7C:
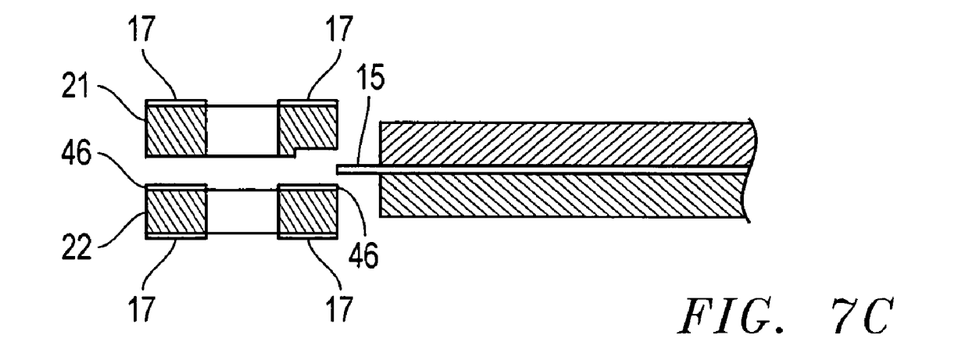
Figure 7D:
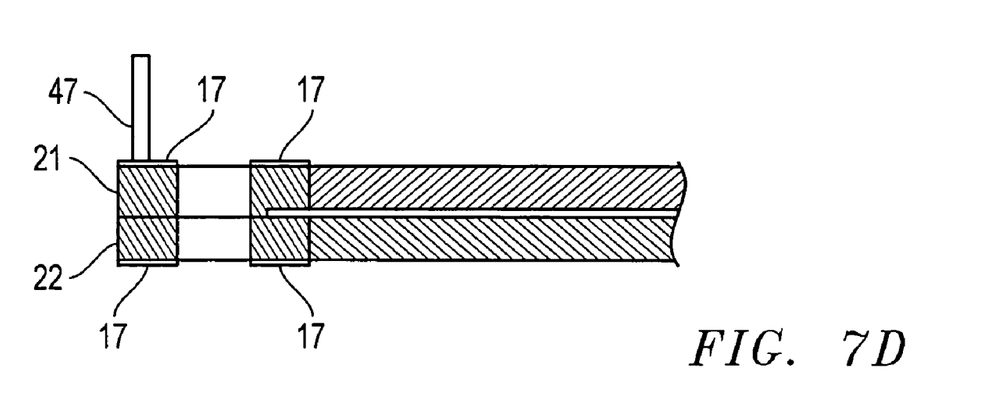

FIGS. 7A-D illustrate a method for making a bipolar plate with a cathode sealing frame and an anode sealing frame in accordance with the present invention. FIG. 7A illustrates the step of providing a fluid barrier 15 having an anode flow field 12 attached to the anode side of the fluid barrier 15 and having a cathode flow field 16 attached to the cathode side of the fluid barrier 15. FIG. 7B illustrates the step of providing an anode sealing frame 21 and a cathode sealing frame 22 having a manifold 13 as required by an electrochemical cell stack. The sealing frames may be produced by a method selected from injection molding, compression molding, machining and combinations thereof. The anode sealing frame 21 has a lip 45 that receives the fluid barrier 15. Optionally, gasket surfaces 17 produced by a screen-printing process are incorporated into the sealing frames 21, 22. FIG. 7C illustrates the step of inserting the fluid barrier 15 into the lip 45 and aligning the sealing frames 21, 22 so that the manifolds 13 are properly aligned. Optionally, a laser absorber layer 46 may be applied to the cathode sealing frame to absorb the laser light used in the laser welding procedure. FIG. 7D illustrates the step of welding the sealing frames 21, 22 together with a laser welder, the laser light 47 being absorbed by the laser absorber layer to melt the polymer frames 21, 22, thereby bonding the frames 21, 22 together.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims

What is claimed is:

1. A bipolar plate, comprising:
  a fluid barrier having a cathode side and an anode side; and
  a sealing frame formed around a perimeter of the fluid barrier, wherein the sealing frame includes an anode sealing frame and a first gasket to provide a sealing surface between an anode side of the bipolar plate and a first membrane and electrode assembly, a cathode sealing frame having a second gasket to provide a sealing surface between a cathode side of the bipolar plate and a second membrane and electrode assembly, and a third gasket to provide a sealing surface between the cathode sealing frame and the anode sealing frame.

2. The bipolar plate of claim 1, wherein the fluid barrier is metal.

3. The bipolar plate of claim 1, wherein the fluid barrier is a material selected from titanium, stainless steel, nickel, tantalum, niobium, and alloys thereof.

4. The bipolar plate of claim 1, wherein the fluid barrier is plated with a metal.

5. The bipolar plate of claim 4, wherein the metal is selected from gold, silver, copper, platinum, and combinations thereof.

6. The bipolar plate of claim 1, further comprising:
  the anode side of the fluid barrier having an anode flow field; and
  the cathode side of the fluid barrier having a cathode flow field.

7. The bipolar plate of claim 6, wherein the anode flow field and the cathode flow field are attached to the fluid barrier before the sealing frame is formed around the perimeter.

8. The bipolar plate of claim 7, wherein the anode flow field and the cathode flow field are attached to the fluid barrier by methods selected from adhesives, sintering, soldering and combinations thereof.

9. The bipolar plate of claim 6, wherein the anode flow field and the cathode flow field are formed from a material selected from expanded metal mesh, metal foam, conducting polymer foam, porous conductive carbon material and combinations thereof.

10. The bipolar plate of claim 6, wherein at least one of the anode flow field and the cathode flow field is chemically etched into the fluid barrier.

11. The bipolar plate of claim 1, wherein the first and second gaskets are applied by print screening.

12. The bipolar plate of claim 1, wherein the first and second gaskets is incorporated into the sealing frame.

13. The bipolar plate of claim 1, further comprising components selected from alignment pins, alignment holes, reinforcing liners for fluid passages, fluid manifolds and combinations thereof, wherein the sealing frame is formed around the components.

14. The bipolar plate of claim 1, wherein the sealing frame comprises an injected polymer selected from a thermoplastic, a thermoset, a reactive set and combinations thereof.

15. The bipolar plate of claim 1, wherein the sealing frame comprises an injected polymer selected from polyvinylidene fluoride, polyvinylidene difluoride, polytetrafluoroethylene, polyamides, polysulfone, polyetherketones, polycarbonate, polypropylene, polyimides, polyurethanes, epoxies, silicones, or a combination thereof.

16. The bipolar plate of claim 15, wherein the sealing frame comprises an injected selected injected polymer is mixed with a filler.

17. The bipolar plate of claim 16, wherein the filler modifies the performance of the polymer.

18. The bipolar plate of claim 16, wherein the filler is a diluent.

19. The bipolar plate of claim 16, wherein the filler is an aromatic polyamide fiber.

20. A bipolar plate, comprising:
a fluid barrier having a cathode side and an anode side;
a cathode sealing frame adapted to receive a perimeter of the cathode side of the fluid barrier;
an anode sealing frame adapted to receive a perimeter of the anode side of the fluid barrier, wherein the cathode sealing frame and anode sealing frame are bonded together to form a fluid seal;
a first gasket to provide a sealing surface between an anode side of the bipolar plate and a first membrane and electrode assembly;
a second gasket to provide a sealing surface between a cathode side of the bipolar plate and a second membrane and electrode assembly; and
a third gasket to provide a sealing surface between the cathode sealing frame and the anode sealing frame.

21. The bipolar plate of claim 20, wherein the fluid barrier is metal.

22. The bipolar plate of claim 20, wherein the fluid barrier is a material selected from titanium, stainless steel, nickel, tantalum, niobium, and alloys thereof.

23. The bipolar plate of claim 20, wherein the fluid barrier is plated with a metal.

24. The bipolar plate of claim 23, wherein the metal is selected from gold, silver, copper, platinum, and combinations thereof.

25. The bipolar plate of claim 20, further comprising:
the anode side of the fluid barrier having an anode flow field; and
the cathode side of the fluid barrier having a cathode flow field.

26. The bipolar plate of claim 25, wherein the anode flow field and the cathode flow field are attached to the fluid barrier before the cathode sealing frame and the anode sealing frame are bonded together.

27. The bipolar plate of claim 26, wherein the anode flow field and the cathode flow field are attached to the fluid barrier by methods selected from adhesives, sintering, soldering and combinations thereof.

28. The bipolar plate of claim 25, wherein the anode flow field and the cathode flow field are formed from a material selected from expanded metal mesh, metal foam, conducting polymer foam, porous conductive carbon material and combinations thereof.

29. The bipolar plate of claim 25, wherein at least one of the anode flow field and the cathode flow field is chemically etched into the fluid barrier.

30. The bipolar plate of claim 20, wherein a material used to form the sealing frames is a polymer.

31. The bipolar plate of claim 30, wherein the polymer is selected from a thermoplastic, a thermoset, a reactive set and combinations thereof.

32. The bipolar plate of claim 30, wherein the polymers are selected from polyvinylidene fluoride, polyvinylidene difluoride, polytetrafluoroethylene, polyamides, polysulfone, polyetherketones, polycarbonate, polypropylene, polyimides, polyurethanes, epoxies, silicones, and combinations thereof.

33. The bipolar plate of claim 32, wherein the selected polymer is mixed with a filler.

34. The bipolar plate of claim 33, wherein the filler modifies the performance of the polymer.

35. The bipolar plate of claim 33, wherein the filler is a diluent.

36. The bipolar plate of claim 33, wherein the filler is an aromatic polyamide fiber.

37. The bipolar plate of claim 20, wherein the cathode sealing frame and the anode sealing frame are bonded by a method selected from heat welding, chemical welding, adhesives, and combinations thereof.

38. The bipolar plate of claim 20, wherein at least one of the gaskets is an o-ring.

39. The bipolar plate of claim 20, wherein at least one of the gaskets is incorporated into one of the sealing frames.

40. The bipolar plate of claim 20, wherein at least one of the gaskets is applied by print screening.

41. The bipolar plate of claim 20, wherein the anode sealing plate and the cathode sealing plate further comprise components selected from alignment pins, alignment holes, reinforcing liners for gas passages, gas manifolds and combinations thereof.

42. The bipolar plate of claim 41, wherein the fluid barrier is a gas barrier that does not extend to the components.

43. The bipolar plate of claim 41, wherein the fluid barrier is a gas barrier that overlaps the anode sealing frame and the cathode sealing frame only a sufficient amount to create a gas-tight seal.

* * * * *